United States Patent [19]

Berry

[11] Patent Number: 5,514,033
[45] Date of Patent: May 7, 1996

[54] POULTRY-HANDLING ASSEMBLY

[75] Inventor: Paul S. Berry, Bedford, England

[73] Assignee: British Technology Group Ltd., London, England

[21] Appl. No.: 140,170

[22] PCT Filed: May 13, 1992

[86] PCT No.: PCT/GB92/00857

§ 371 Date: Nov. 5, 1993

§ 102(e) Date: Nov. 5, 1993

[87] PCT Pub. No.: WO92/20223

PCT Pub. Date: Nov. 26, 1992

[30] Foreign Application Priority Data

May 14, 1991 [GB] United Kingdom .................. 9110455

[51] Int. Cl.⁶ ............................................ A22C 21/00
[52] U.S. Cl. ........................ 452/182; 452/178; 452/183
[58] Field of Search ............................ 452/177, 178, 452/179, 181, 182, 183, 184, 58

[56] References Cited

U.S. PATENT DOCUMENTS

| | | | |
|---|---|---|---|
| 4,150,374 | 4/1979 | Brook | 452/177 |
| 4,215,654 | 8/1980 | Parker, Jr. | 452/178 |
| 4,272,863 | 6/1981 | Parker, Jr. | 119/97 R |
| 4,301,770 | 11/1981 | Parker, Jr. | 119/97 R |
| 4,307,683 | 12/1981 | Parker, Jr. | 452/188 |
| 5,088,959 | 2/1992 | Heemskerk | 452/183 |
| 5,108,345 | 4/1992 | Harben, III et al. | 452/182 |
| 5,129,857 | 7/1992 | Keiter et al. | 452/179 |
| 5,259,811 | 11/1993 | Berry | 452/183 |
| 5,290,187 | 3/1994 | Meyn | 452/178 |

FOREIGN PATENT DOCUMENTS

| | | |
|---|---|---|
| 0145077 | 6/1985 | European Pat. Off. . |
| 0355037 | 2/1990 | European Pat. Off. . |
| 2611115 | 8/1988 | France . |
| 2128870 | 5/1984 | United Kingdom . |

Primary Examiner—Willis Little
Attorney, Agent, or Firm—Cushman, Darby & Cushman

[57] ABSTRACT

A poultry-handling assembly (10) (FIG. 6) comprises two endless conveyors (12,13) arranged side-by-side and adapted to move poultry from a first location (15) to a second location (17). Access means at the first location allows birds to enter the assembly (10) one by one e.g. with one foot on one conveyor (12) and the other foot on the other conveyor (13). Conveyor guide means constrain the conveyors (12,13) to present an open-bottomed V-shaped trough configuration at the second location, where the legs of the birds will slip between the two conveyors (12,13) for engagement by a restraint device (19) and subsequent take-up by the shackles of a processing plant shackle line (20). In an alternative embodiment (FIG. 9), the conveyors (12,13) are replaced by two side-by-side conveyors 38,39 which grip the birds laterally.

14 Claims, 9 Drawing Sheets

POULTRY-HANDLING ASSEMBLY

The present invention relates to a poultry-handling assembly.

There are about 500 million broiler birds slaughtered each year in the United Kingdom alone. The birds are removed from the transport containers and shackled at about 1000 birds/man-hour. A typical processing line operates at about 5,000 birds/hour, has 1,200 or so shackles, and moves at around 0.2 meters/second. Other Western European countries have similar per capita production rates while in the USA, the per capita production rate is about twice that of the UK.

There is currently a great deal of welfare concern about the handling and transport of poultry. Using operatives to remove the live birds from their containers and then hang them on shackles at the processing plant is a frequent source of stress and injury to the birds, mainly due to the poor quality of manual handling.

It is an object of the present invention to provide a poultry-handling assembly such that manual handling at the shackling site can either be avoided altogether or at least reduced to a minimum.

According to the present invention, a poultry-handling assembly for use with a shackle line comprises conveying means operative to move the birds to a shackling site at which the conveying means supports the birds with at least their lower leg regions free of the conveying means for engagement by a shackle and subsequent take-up by the shackle line, the conveying means comprising two conveyors which together either grip the birds laterally at said shackling site or provide a support surface underneath the birds at said shackling site.

In one such case, for example, the two conveyors cooperate so as together to present said support surface in the form of an open-bottomed V-shaped trough configuration at said shackling site. Conveniently, in this instance, the conveyors increasingly assume said trough configuration as they move forward from an input site at which they abut one another in a shallow-vee or horizontal disposition.

Where the conveying means comprises two conveyors which grip the birds laterally at said shackling site, then the bird-engaging surfaces of the conveyors conveniently carry resilient gripping elements profiled to allow relative movement between adjacent elements.

In one such case, the elements are profiled to allow relative movement in at least two different directions.

Conveniently, the poultry-handling assembly includes a re-orientation/metering device operative to encourage the birds to travel backwards towards the shackling site.

Conveniently, the shackles are open-fronted shackles.

Conveniently, the shackles are made of wire but in an alternative design they are made of a plastics material with a metal insert to make them electrically conducting (for stunning).

Conveniently, the plastics shackles include key-hole shaped slots for accepting the lower leg portions of the birds.

Conveniently, a leg divider is provided at or upstream of the shackling site to facilitate take-up by the shackles.

Alternatively, the shackles themselves include a leg-divider portion.

Conveniently, the poultry-handling assembly includes a detection device operative to detect the arrival of a bird at the shackling site, a shackle accumulator, and transfer means operative at the command of the detection device to transfer a shackle from the shackle accumulator to the shackling site.

The invention also includes a poultry-handling apparatus incorporating both the poultry-handling assembly of the present invention and a shackle line adapted to be supplied with poultry from the assembly.

The invention further includes a processing plant incorporating such apparatus and means for stunning, slaughtering and, optionally, plucking the birds.

Embodiments of the invention will now be described, by way of example only, with reference to the accompanying somewhat diagrammatic drawings, in which.

Thus, referring first to FIG. 1–8 of the drawings, a poultry-handling assembly in accordance with a first embodiment of the present invention comprises two endless side-by-side belt conveyors 12, 13 to which individual birds are delivered travelling backwards at spaced intervals from the usual crate unloading area (not shown).

Figure 7:
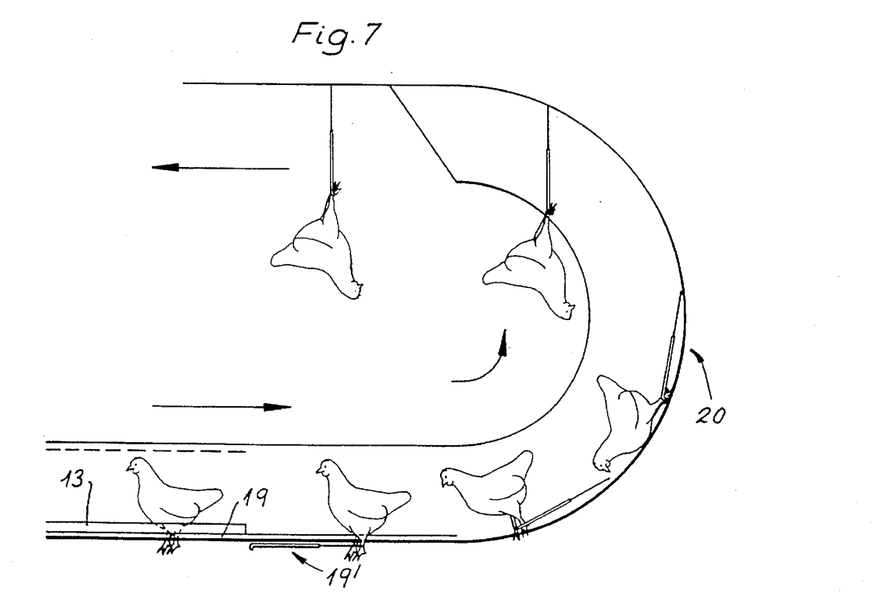
FIG. 7 shows how the assembly of FIGS. 1 to 6 can be used for loading birds into a conventional shackle line.

In operation, the conveyors 12, 13 are driven as indicated to move poultry from a first location 15 (FIG. 1) at which the birds first enter the assembly one by one, either sitting on the two conveyors or with one foot on one conveyor and the other foot on the other conveyor. On arrival at a second location 17 (FIG. 3), the legs of the birds slip through the gap between the two conveyors for engagement by an open-fronted leg-divider and restraint device 19. From here, the birds are taken up by the new (open-fronted) shackles 19' of an otherwise conventional shackle line 20, as shown in FIG. 7.

Figure 1A:
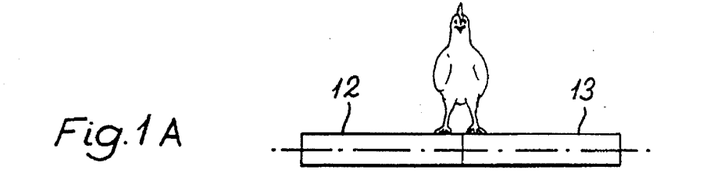
FIGS. 1A and 1B, FIGS. 2A and 2B, and FIGS. 3A and 3B are end-on and side views of part of a poultry-handling assembly according to a first embodiment of the present invention (viewed at three successive locations)
Figure 1B:
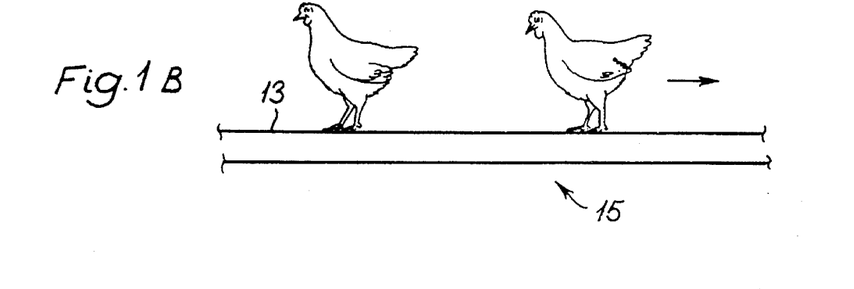
Figure 2A:
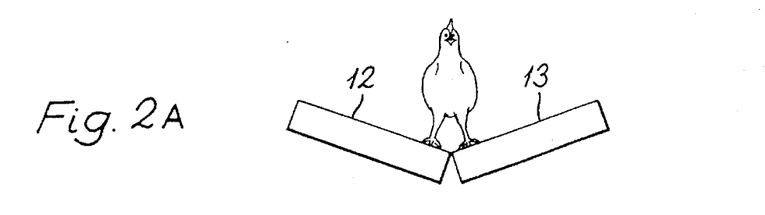
Figure 2B:
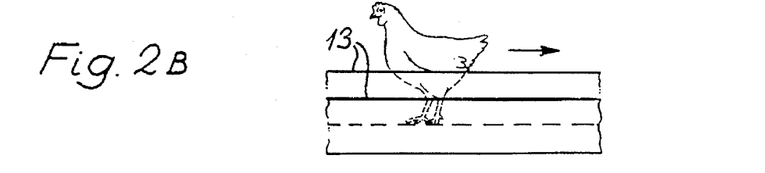
Figure 3A:
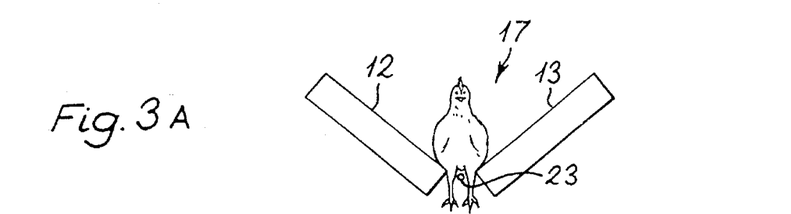
Figure 3B:
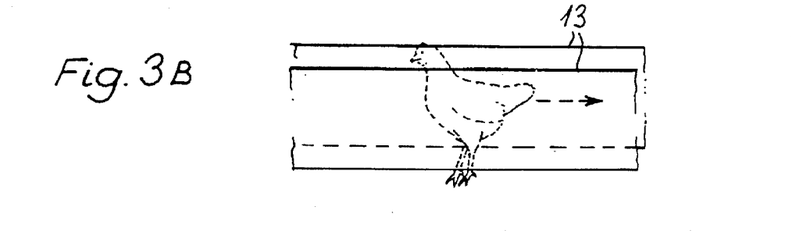

It will be observed that although the conveyors 12, 13 are horizontally disposed and co-planar where the birds enter the assembly (FIG. 1), they define an increasingly steeper-sided V-shape as they move towards the open-bottomed configuration of FIG. 3. Indeed, the inclinations define support means and are such that at a certain point, the belts will slope too strongly for the birds to be able to maintain their grip on them and the birds' legs will slip down through the gap 21 for engagement by the restraint device 19 as already described.

Figure 4A:
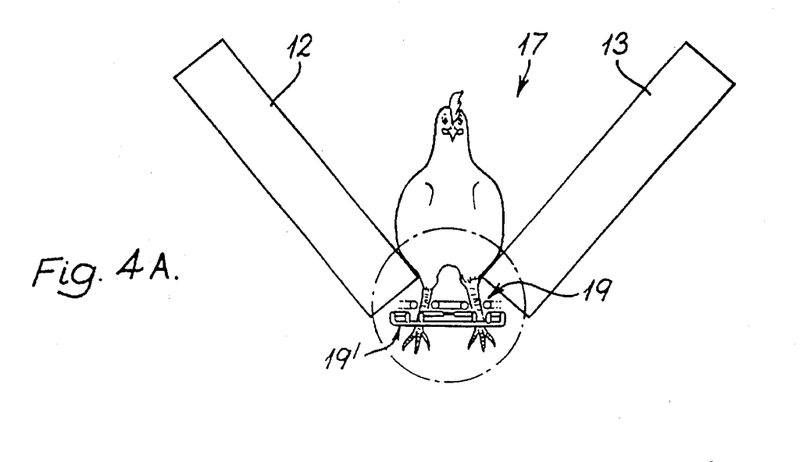
FIGS. 4A and 4B show the same thing as FIGS. 3A and 3B but on a larger scale and in more detail.
Figure 4B:
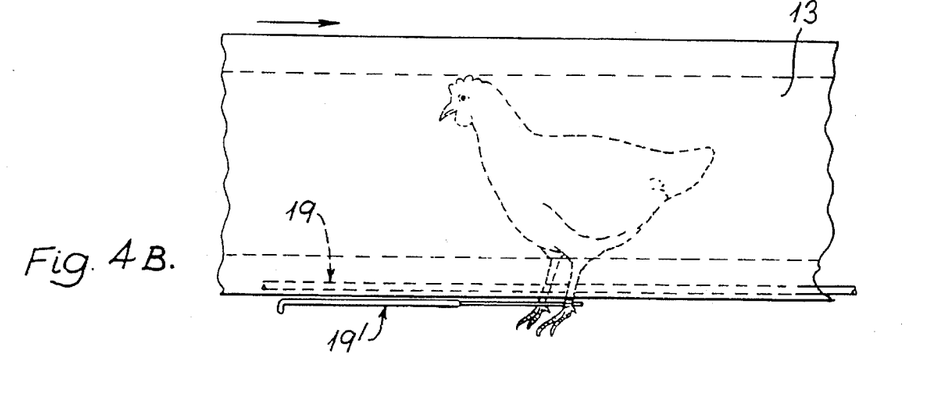
Figure 4C:
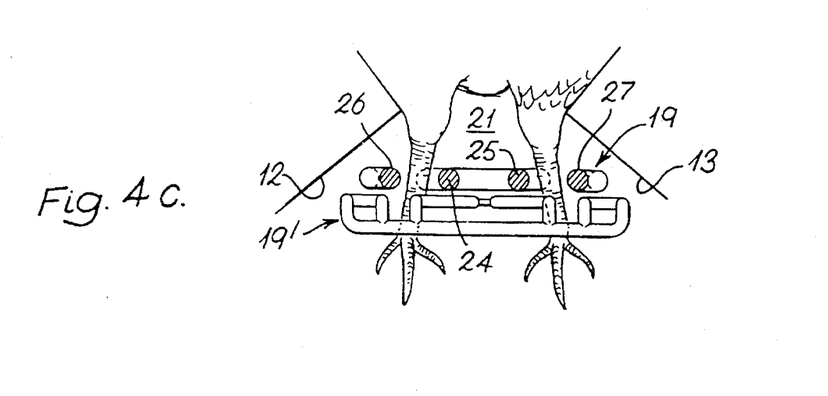
FIG. 4C shows on a still larger scale the ringed portion of FIG. 4A.
Figure 5A:
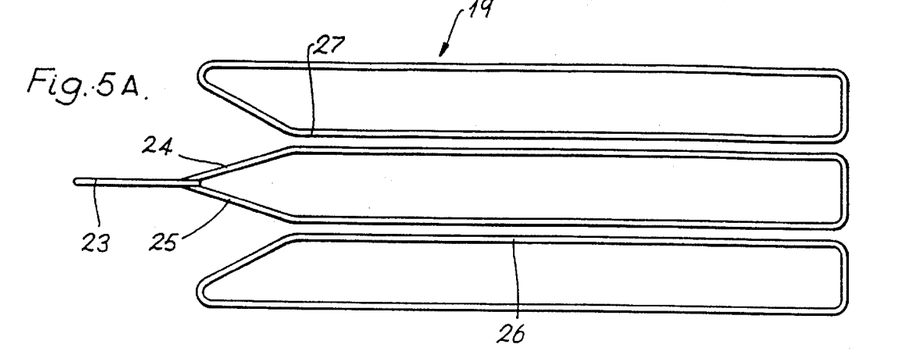
FIGS. 5A and B show, on the same scale as FIG. 4C, plan and side views of the leg divider and restraint depicted in FIG. 4C.
Figure 5B:
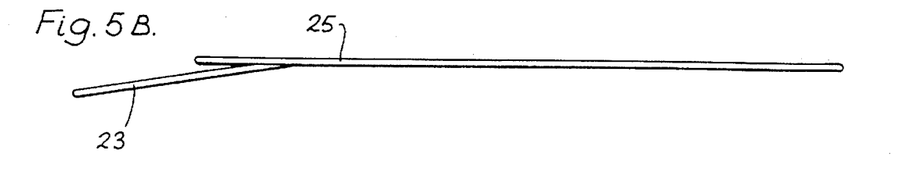

The structure and operation of the leg-dividing device 19 are best understood from FIGS. 4C, 5A and 5B. Thus referring now in particular to these figures, reference numeral 23 indicates a downwardly inclined central leg-divider bar of the device which is introduced between the birds' legs and then divides into two spreader bars 24, 25 which hold the birds' legs apart as the birds are carried along by the conveyors 12, 13. Two further bars taper in from each side of the device to form outside leg restraints 26, 27.

Figures 6A, 6B, 6C, 6D:
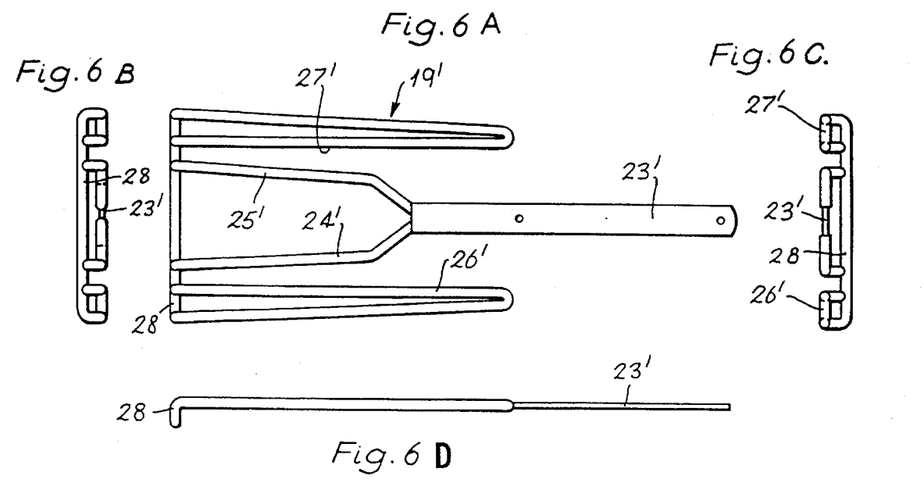
FIG. 6 shows, on the same scale as FIG. 4C, plan and side and opposite end views of the new (open-fronted) shackle depicted in FIG. 4C.

The structure of the open-fronted shackle 19' is best understood from FIGS. 4C and 6 and comprises attachment member 23', inner leg restraints 24', 25' and outer leg restraints 26', 27'. At its trailing end, shackle 19' is completed by a downwardly-turned stop bar 28.

With reference to FIG. 4C, it will be appreciated that the restraint device 19 has been sectioned at a position upstream of the shackle 19'. Clearly, at the point when the bird is transferred from the restraint device to the shackle, the bird's legs will have been separated by device 19 so as to line up exactly with the gaps between the inner and outer leg restraints of the shackle.

In operation, when the birds' legs have been suitably separated and restrained by the array 23–27 as above described, the birds are pulled away from the open topped device 19 by successive open-fronted shackles of the shackle line 20. FIG. 7 shows how the birds are then lifted up and round until they are hanging upside down ready for a subsequent stun and slaughter operation in the following section of the processing plant (not shown).

Figure 8:
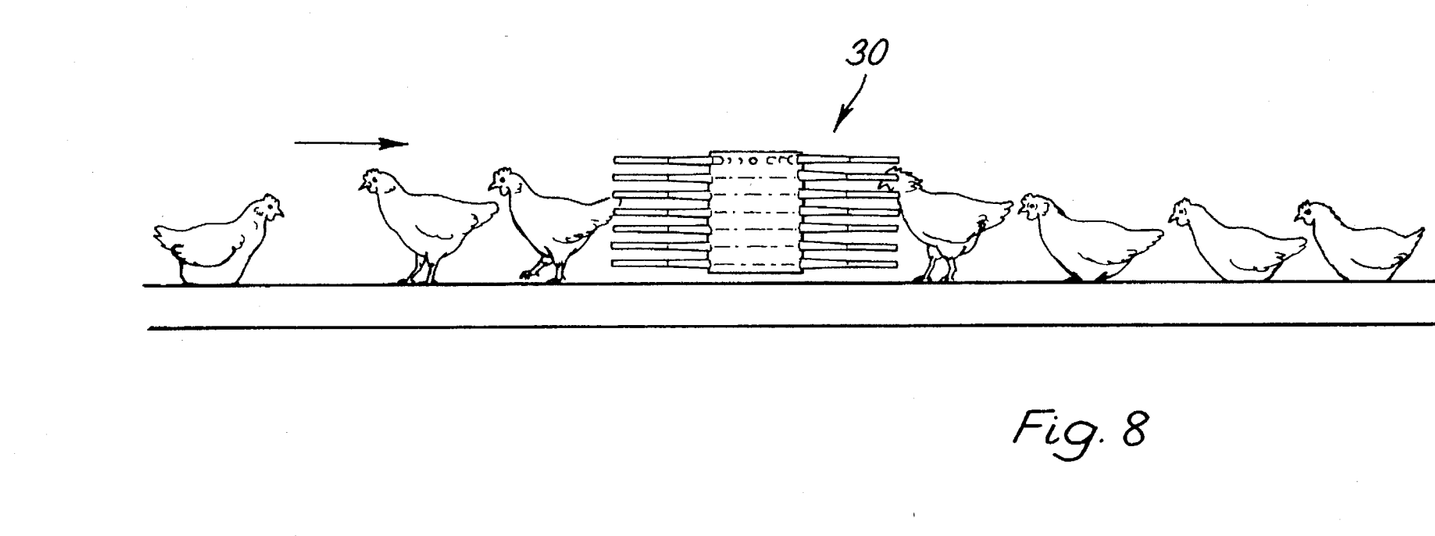
FIG. 8 is a side view of a re-orientation device for use at the front end of the assembly.
Figure 9:
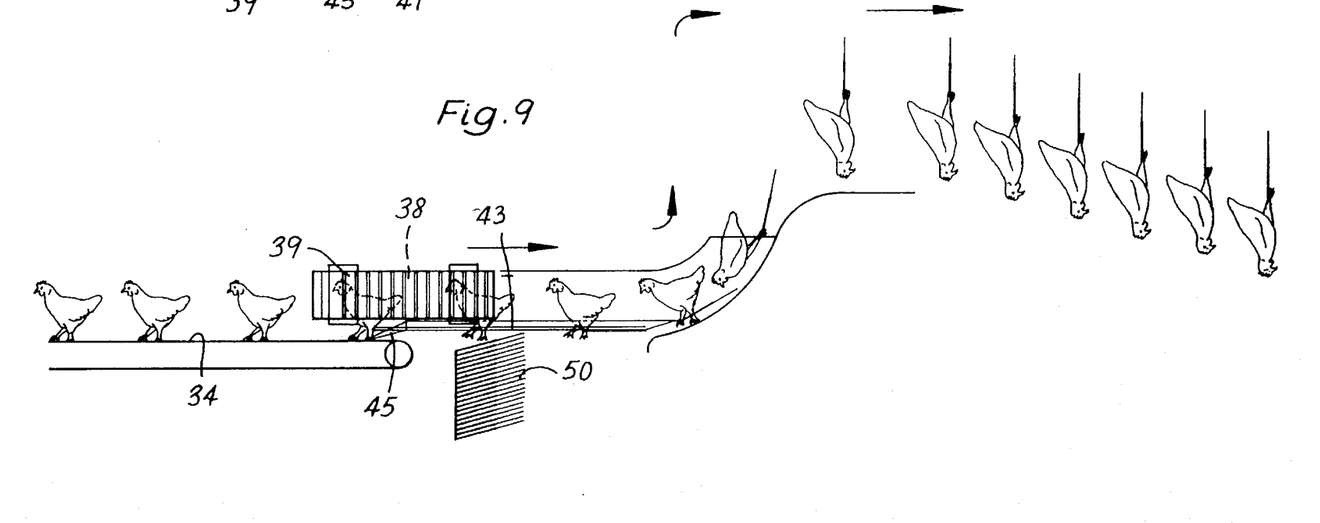
FIGS. 9 and 10 are respectively plan and side views of a currently preferred second embodiment of the invention in which the birds are laterally gripped at the shackling site rather than supported from underneath.

FIG. 8 shows a re-orientation/metering device 30 comprising two side-by-side flexible-fingered rotors e.g. either as disclosed at 12, 13 in FIG. 1 of UKPA 2128870A (National Research Development Corporation) or as disclosed at 306, 307 in the drawing of U.S. Pat. No. 5,259,811.

Device 30 operates to encourage the birds to travel backwards through the assembly at a roughly regular spacing.

Preferably, an operative is at hand in the vicinity of the shackling station so as to reorientate and/or respace any birds not properly presented by device 30.

A second embodiment of the invention will now be described with reference to FIGS. 9 to 14 where two gripping conveyors 38, 39 receive the birds rear-first at fairly regularly-spaced intervals on an input belt 34 thanks to a FIG. 8-type re-orientation/metering device (not shown).

As before, an operative will preferably also be present to deal with any birds not satisfactorily presented by the FIG. 8 device.

Figures 13A, 13B:
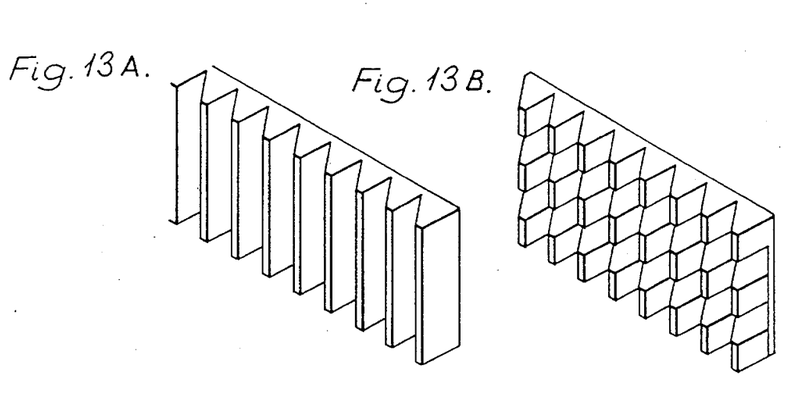
FIGS. 13A—C show perspective views of three different designs of gripping elements for the bird-gripping belts of FIGS. 9 and 10.
Figure 13C:
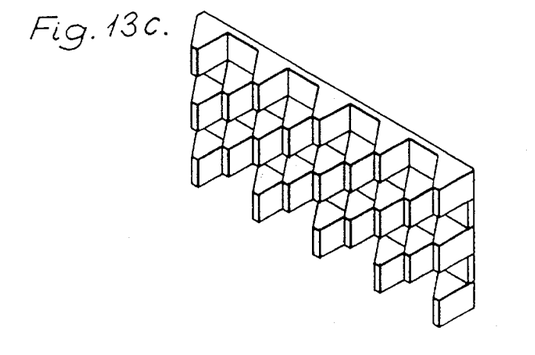

The two gripping conveyors 38, 39 with their specially profiled foam-rubber faces 41 (see FIG. 13 defining support means), overlap the input belt 34 and support and grip the birds laterally so that at least the lower portions of the birds' legs are free of the conveyors 38, 39 when the birds leave the confines of the input belt.

Figure 11:
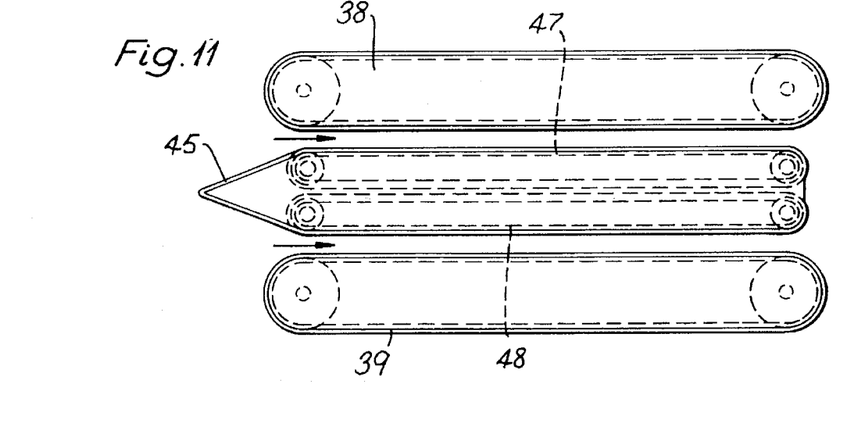
FIGS. 11 and 12 are respectively plan and side views of a preferred design of restraint member for use in the assembly of FIGS. 9 and 10.
Figure 12:
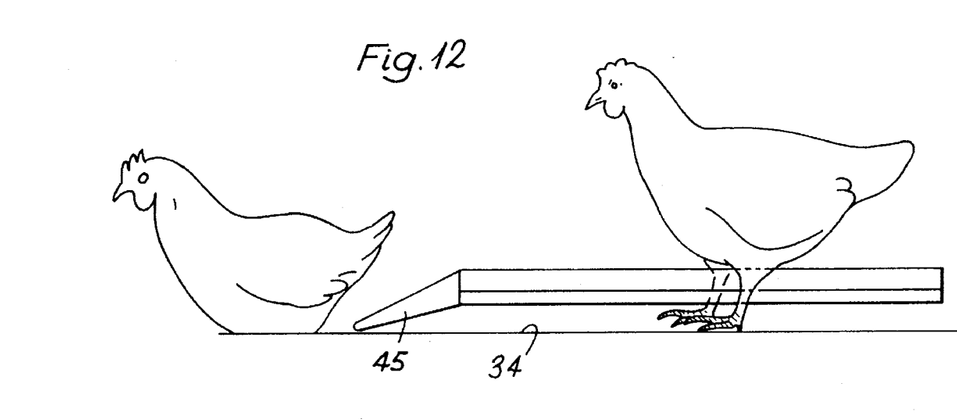

At this point, a leg restraint 43 is provided which can either be of the sort illustrated at 19 (in the earlier FIG. 5) or of the sort illustrated in FIGS. 11 and 12.

In this latter design, the spreader bars of the earlier restraint are replaced by a static nose portion 45 leading to a pair of counter-rotating round-section belts 47, 48. The outer faces of these belts move backwards adjacent to and at the same speed as the inner faces of the conveyors 38, 39. This arrangement has the advantage that all the parts engaging the birds' legs are moving at the same speed and direction. This avoids the rubbing effect that can occur with the FIG. 5 system where the restraint members are stationary and the birds' legs will brush along these members as they are taken up by the shackle line. For clarity, the gripping belts 38, 39 have not been included in FIG. 11.

It will be noted from FIG. 12 that, as before, the nose portion (45) of the restraint device slopes downwardly towards the input belt 34 so as to force into a standing position any bird initially sitting on the belt 34.

Returning now to FIG. 9, reference numeral 50 indicates a shackle accumulator from whence the shackles are released as required to run along under the waiting bird and pick-up the birds' legs.

Figure 14:
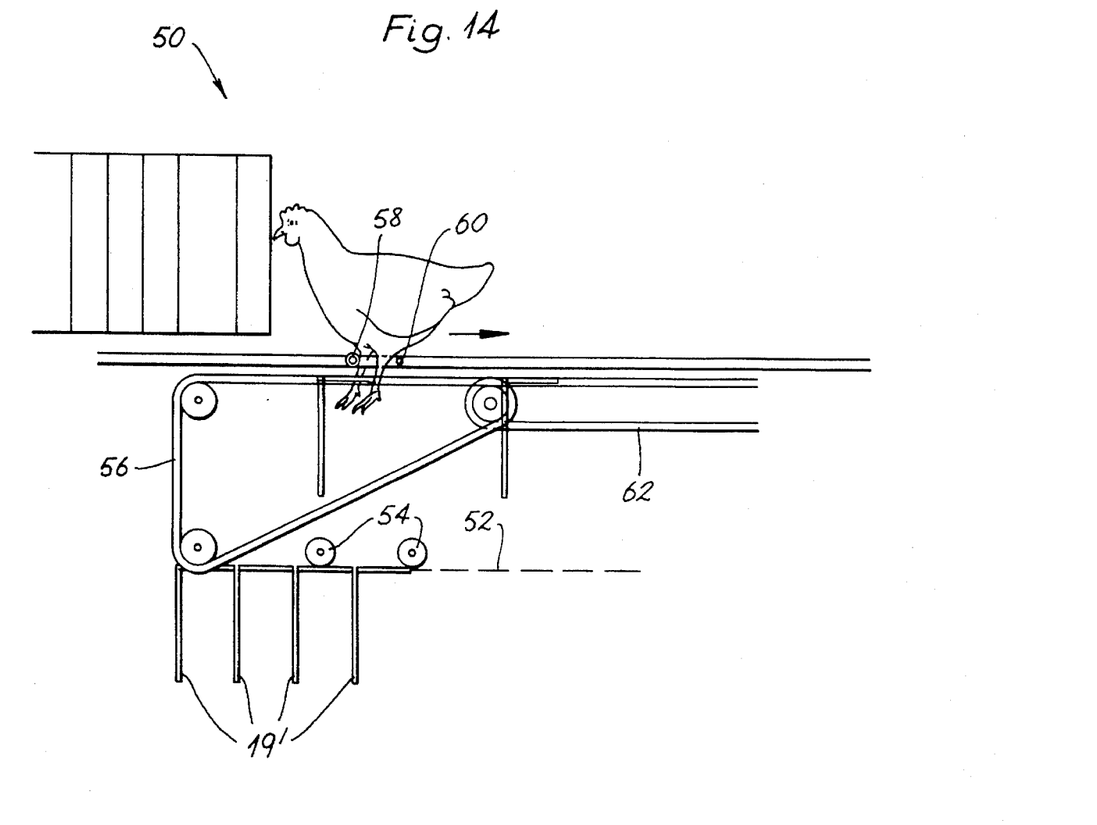
FIG. 14 shows a shackle accumulator unit for use at the shackling site.

The accumulator 50 is shown in more detail In FIG. 14 and includes a shackle-collection rail 52, a number of externally-driven friction rollers 54, a hook conveyor 56 (the hooks not being shown), a proximity switch 58 and a hold-back spring 60.

As will be seen, the rail 52 is loaded with a number of empty shackles 19' which have been gravity fed to the rail following the earlier removal of the processed carcasses from them.

The friction rollers 54 operate to ensure that the shackles are bunched together at the free end of fall 52 for even take-up by the hook conveyor 56 wherever the proximity switch 58 indicates the arrival of a bird at the shackling site. On these occasions, clockwise rotation of the hook conveyor 56 unloads the next shackle from the rail 52 and moves it up and under the detected bird into engagement with the bird's legs.

Figure 10:
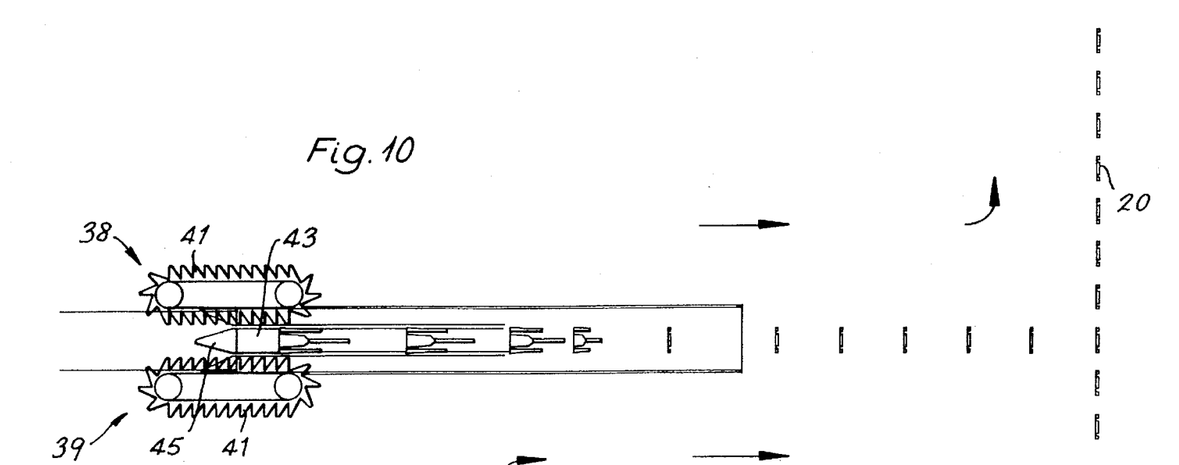

Continued clockwise motion of the conveyor 56 overcomes the predetermined force provided by the hold-back spring 60 and the loaded shackle joins those already waiting on the transport conveyor 62 for entry (one by one) into the processing plant shackle line 20 (FIG. 10).

Figure 15A:
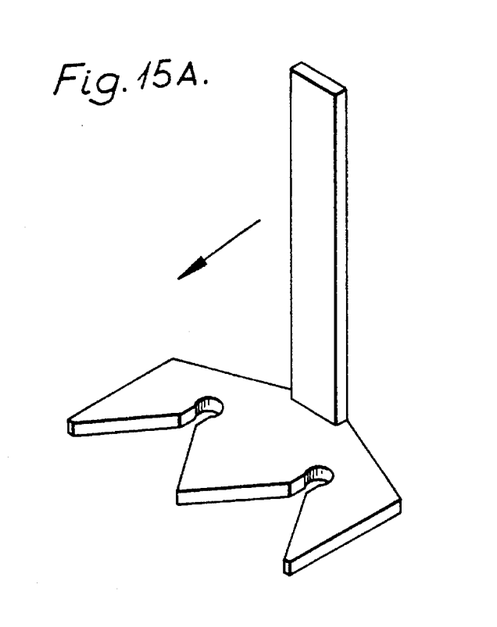
FIGS. 15A and B show perspective views of alternative designs of open-fronted shackle to that depicted in FIG. 6.

As alternatives to the open-fronted shackles shown in FIG. 5, FIGS. 15A and B show two other possible designs, each cast in a plastics material such as nylon or made of a soft rubber material. Naturally, these shackles must be able to conduct electricity for the stunning process to take place and to this end a metal insert (not shown) is included which in use will make contact with the birds' feet during stunning.

Figure 15B:
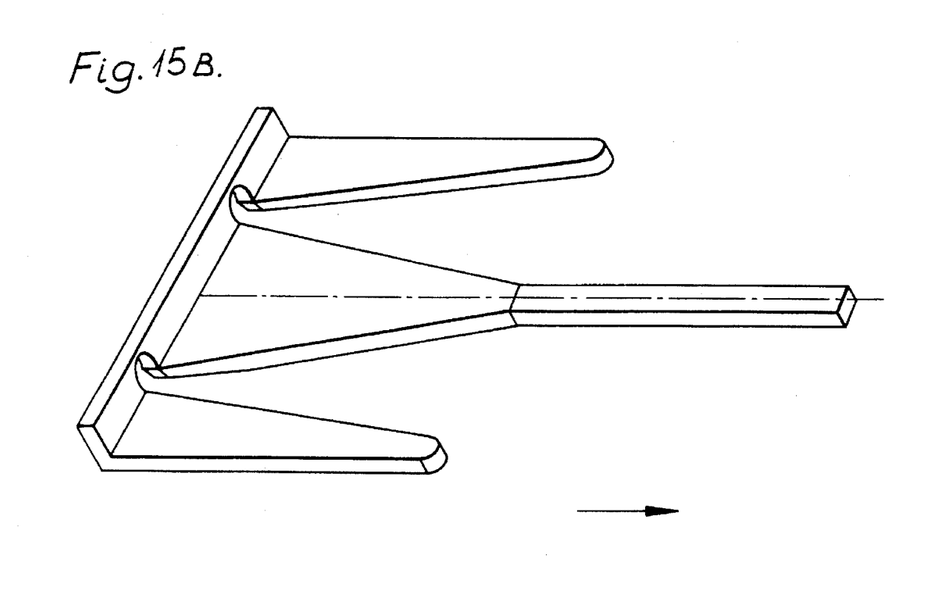

It is envisaged that the key-hole shape incorporated in these plastics shackles will enable the birds' legs to be held firmly and safely but without exerting excessive pressure on them.

Clearly, the throughput of birds possible with the assemblies of the present invention will depend on a large number of factors but, typically, it is expected that the conveyors would be run at, say, 0.25 to 0.5 meters/second so that shackling at the line speed of 5,000 to 10,000 birds/hour could be achieved by running two or even three such assemblies side by side.

I claim:

1. A poultry handling assembly comprising:

shackling means disposed at a shackling site including open-fronted shackles;

conveying means for moving a bird in the upright position to the shackling site, said conveying means being constructed and arranged to support the bird with at least lower leg regions thereof free of the conveying means for engagement by a shackle and subsequent take-up thereby, said conveying means including support means for supporting a portion of the bird at the shackling site while the leg regions thereof are engaged by a shackle; and separating means for separating the leg portion of the bird as the bird is being conveyed by the conveying means so as to be engaged by a shackle, said conveying means including at least two conveyors.

2. The poultry handling assembly according to claim 1, wherein said two conveyors cooperate to define said support means, said support means including surfaces defining an opened-bottom V-shaped trough at the shackling site.

3. A poultry-handling assembly as claimed in claim 2, wherein the conveyors increasingly assume said trough configuration as they move forward from an input site at which they abut one another in a shallow-vee or horizontal disposition.

4. A poultry-handling assembly as claimed in claim 1, wherein the two conveyors include resilient gripping elements profiled to allow relative movement between adjacent gripping elements.

5. A poultry-handling assembly as claimed in claim 4, wherein the gripping elements are profiled to allow relative movement in at least two different directions.

6. A poultry handling assembly comprising:

shackling means disposed at a shackling site including open-fronted shackles;

conveying means for moving a bird in the upright position to the shackling site, said conveying means being constructed and arranged to support the bird with at least lower leg regions thereof free of the conveying means for engagement by a shackle and subsequent take-up thereby, said conveying means including support means for supporting a portion of the bird at the shackling site while the leg regions thereof are engaged by a shackle; and separating means for separating the leg portion of the bird as the bird is being conveyed by the conveyor means so as to be engaged by a shackle.

7. A poultry-handling assembly as claimed in claim 6 further comprising a re-orientation/metering device operative to encourage the birds to travel backwards towards the shackling site.

8. A poultry-handling assembly as claimed in claim 6, wherein the shackles are made of wire.

9. A poultry-handling assembly as claimed in claim 6, wherein the shackles are made of a plastics material having a metal insert so as to make the shackles electrically conductive.

10. A poultry-handling assembly as claimed in claim 9 wherein the plastics shackles include key-hole shaped slots for accepting the lower leg portions of the birds.

11. A poultry-handling assembly as claimed in claim 6 wherein said separating means include a leg divider provided at or upstream of the shackling site to facilitate take-up by the shackles.

12. A poultry-handling assembly as claimed in claim 6 wherein the shackles include a leg-divider portion.

13. The poultry handling assembly according to claim 6, wherein said conveyor means comprises first and second conveyor structures arranged in spaced relation, said second conveyor structure including first and second conveyors having generally horizontally disposed surfaces cooperating to define said support means, said surfaces being constructed and arranged to support and grip the bird laterally at the shackling site.

14. A poultry handling assembly comprising:

shackling means disposed at a shackling site including open-fronted shackles;

conveying means for moving a bird to the shackling site, said conveying means being constructed and arranged to support the bird with at least lower leg regions thereof free of the conveying means for engagement by a shackle and subsequent take-up thereby, said conveying means including support means for supporting a portion of the bird at the shackling site while the leg regions thereof are engaged by a shackle;

separating means for separating the leg portion of the bird as the bird is being conveyed by the conveyor means so as to be engaged by a shackle;

a detection device operative to detect the arrival of a bird at the shackling site;

a shackled accumulator; and transfer means operative at the command of the detection device to transfer a shackle from the shackle accumulator to the shackling site.

* * * * *